United States Patent [19]

Ushiro

[11] Patent Number: 4,593,354
[45] Date of Patent: Jun. 3, 1986

[54] DISK CACHE SYSTEM
[75] Inventor: Sotaro Ushiro, Tokyo, Japan
[73] Assignee: Tokyo Shibaura Denki Kabushiki Kaisha, Kawasaki, Japan
[21] Appl. No.: 580,703
[22] Filed: Feb. 16, 1984
[30] Foreign Application Priority Data Feb. 18, 1983 [JP] Japan .................................. 58-25773

[51] Int. Cl.$^4$ ............................................ G06F 12/08
[52] U.S. Cl. .................................................... 364/200
[58] Field of Search ... 364/200 MS File, 900 MS File
[56] References Cited

U.S. PATENT DOCUMENTS 4,399,503  8/1983  Hawley ............................... 364/200

OTHER PUBLICATIONS

Toombs, Dean, "CCD and Bubble Memories: System Implications", *IEEE Spectrum*, vol. 15, No. 5, May 1978, pp. 36–39.

*Primary Examiner*—Raulfe B. Zache
*Attorney, Agent, or Firm*—Cushman, Darby & Cushman

[57] ABSTRACT

In response to a command including file extent information defining a file area received from a host processor, a disk cache processor stores the file extent information in an extent table and reserves a corresponding area in a disk cache buffer. In response to a WRITE command, the processor stores the data in the corresponding reserved area of the disk cache buffer and sets a write flag of the corresponding entry of a cache directory. When the processor is idling, it writes to a disk unit the data in the disk cache buffer which has not yet been written to the disk unit, and resets the corresponding write flag. In response to a command received from the host processor which has file extent information and designates a logical termination of a program, the processor writes all of the not-yet-written data which corresponds to the file area indicated by the extent information. When an error is caused during data write to the disk unit, the processor stores corresponding error status information into an error log table such that it corresponds to the extent information in the extent table. After data write into the designated area is terminated, the processor fetches the error status information for this file area alone and transfers the fetched information to the host processor.

8 Claims, 9 Drawing Figures

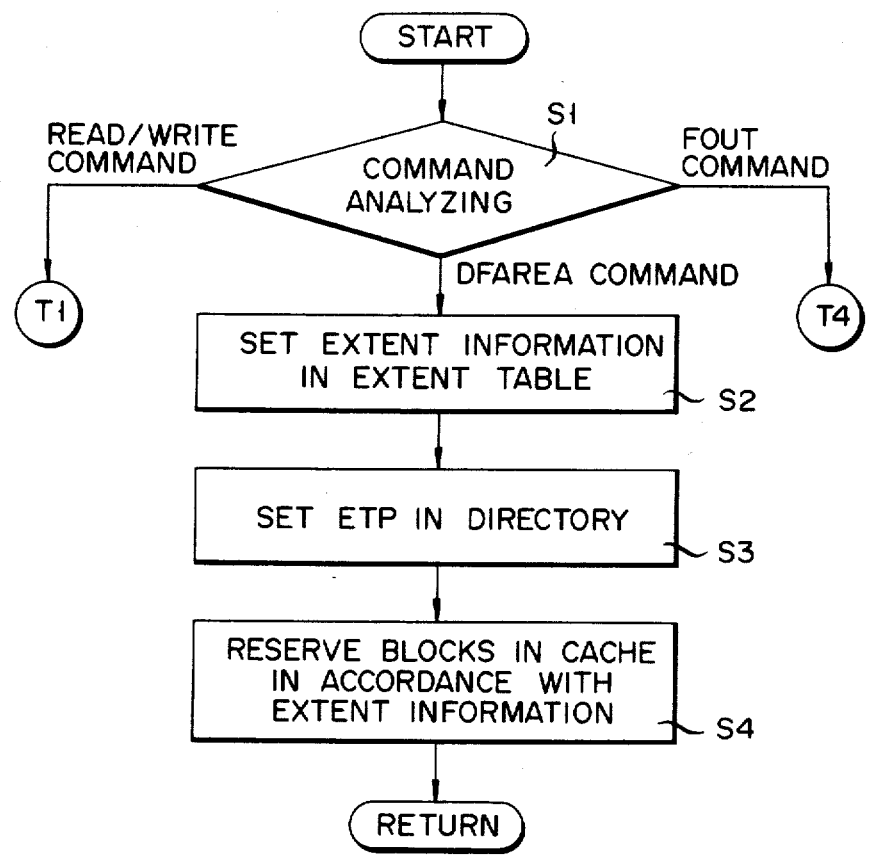

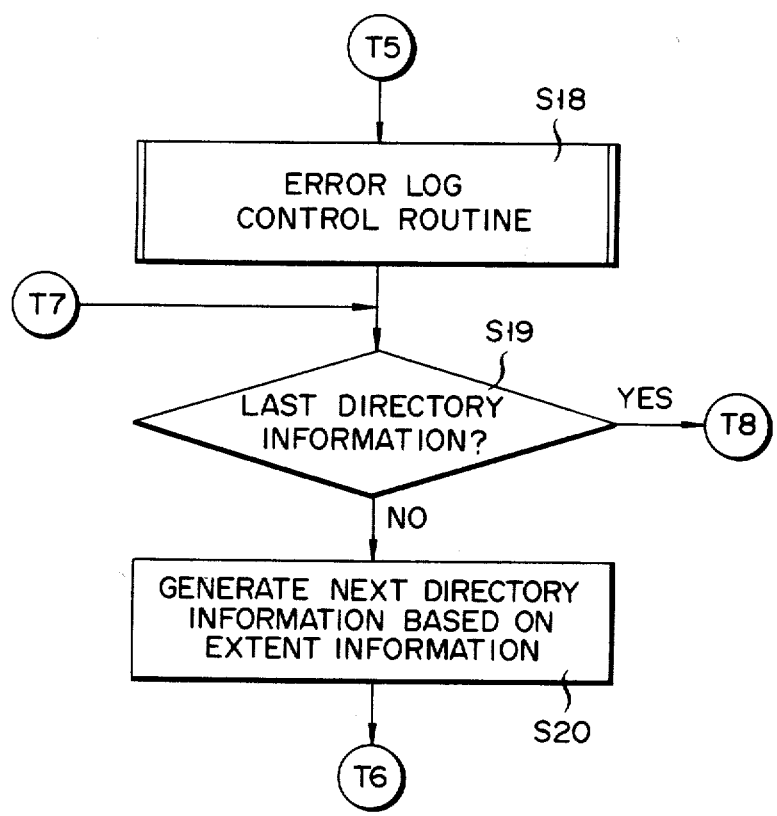

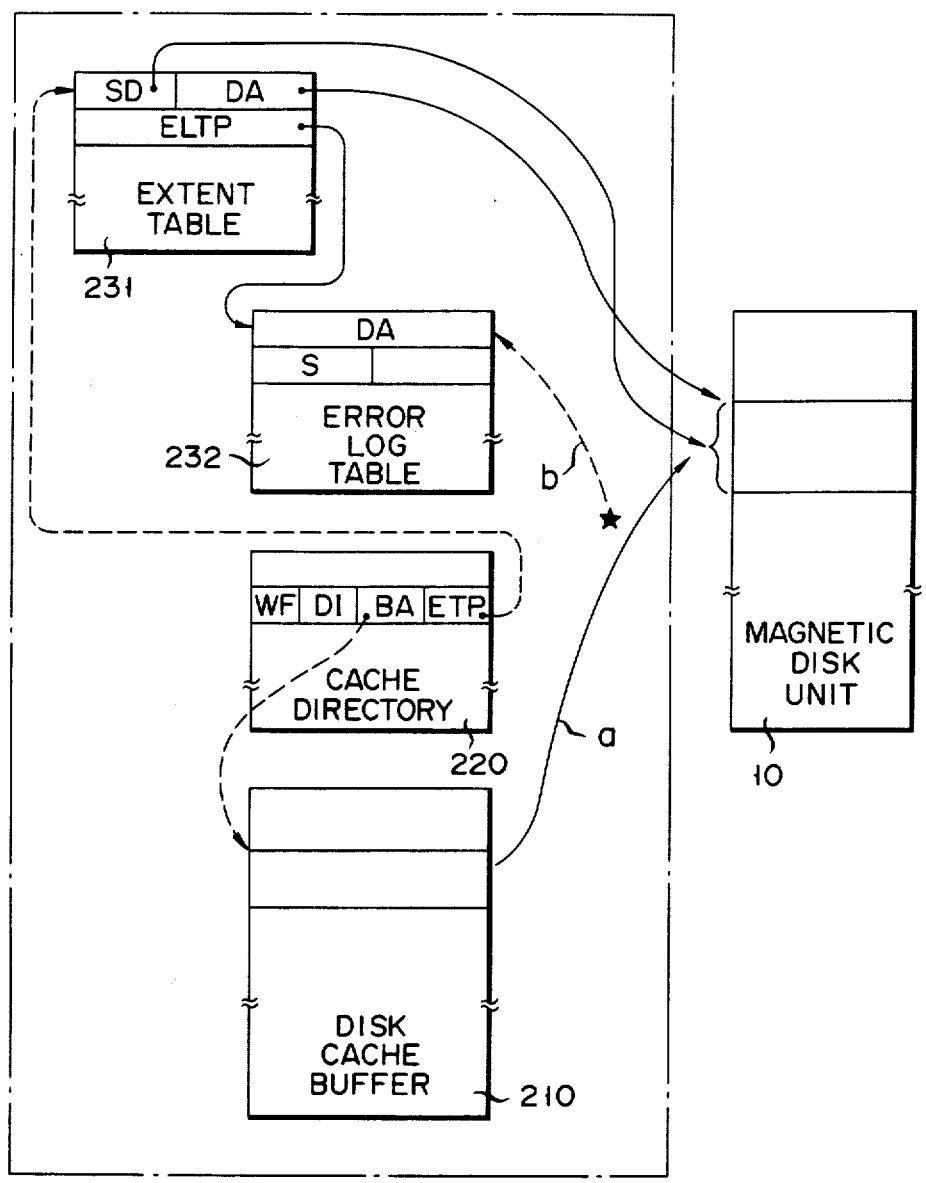

DISK CACHE SYSTEM

BACKGROUND OF THE INVENTION

The present invention relates to a disk cache system having a disk controller with a disk cache buffer.

A disk cache system generally adopts at least one of the store-in mode and the store-through mode. In the store-in mode, data is written in only a disk cache buffer in response to a write request into a disk unit. A write flag is set at an entry (an entry of a cache directory) corresponding to a block (block in a disk cache buffer) in which the data is written. The write flag indicates whether or not data of a corresponding block has been written in a disk unit. The data of the block corresponding to an entry (entry of the cache directory) having a set write flag is written in the disk unit utilizing the idle time of the disk controller. Upon data write in the disk unit, the write flag is reset. In contrast to this, in the store-through mode, data is simultaneously written in both a disk cache buffer and a disk unit in response to a write request into the disk unit. When a write request is generated, input/output end is obtained when data write into the disk cache buffer is ended in the store-in mode while it is obtained when data write into the disk unit is ended in the store-through mode.

In this manner, in the store-in mode, although the data writing to the disk can be performed to allow effective use of the disk cache buffer, write data on the disk cache buffer may not coincide with that at the corresponding area of the disk upon logical completion of the program. Furthermore, in the store-in mode, since the operation of the program and the write operation into the disk from the disk cache buffer are not synchronized with each other, when an error is generated (e.g., a CRC error, a seek error, etc.) during data write into the disk, error recovery by means of the program is hard to perform.

In contrast to this, although the program operation and the write operation into the disk can be synchronized in the store-in mode, the access time for data write cannot be shortened, so that the advantageous features of the disk cache buffer cannot be effectively used.

SUMMARY OF THE INVENTION

It is an object of the present invention to provide a disk cache system wherein data on a disk cache buffer coincides with that on a corresponding area of a disk even in the store-in mode when a program logically ends.

It is another object of the present invention to provide a disk cache system, which allows error recovery by means of a program even if an error occurs during data write into the disk in the store-in mode.

According to the present invention, there is provided a disk cache system comprising a host processor, a disk unit, and a disk controller interposed therebetween and incorporating therein a disk cache buffer, said disk controller having a cache directory for controlling said disk cache buffer in units of blocks of a predetermined size and having write flags in respective entries; an error log table in which error status information is set; an extent table having entries in which file extent information is set; first means, responsive to a first command generated from the host processor and having the file extent information defining a file area, for setting the file extent information in the extent table and for securing a corresponding area in said disk cache buffer; second means, responsive to a second command generated from said host processor and requesting write into said disk unit, for storing data into the corresponding area of said disk cache buffer and for setting the write flag of the entry of said cache directory; third means for writing into said disk unit data in said disk cache buffer which has not been written in said disk unit utilizing an idle time of input/output processing using said disk cache buffer and for resetting the write flag of the corresponding entry of said cache directory; fourth means, responsive to a third command generated from said host processor, having the file extent information, and designating a logical termination unit of a program, for writing into said disk unit data corresponding to the file area represented by the file extent information in said third command and for resetting the write flag of the corresponding entry of said cache directory, said data being selected from the data in said disk cache buffer which has not been written in said disk unit; fifth means, when an error is generated during data write into said disk unit, for setting the error status information into said error log table such that said error status information corresponds to the file extent information stored in said extent table and defining file areas including an area in which the data is to be written; and sixth means for selectively fetching from the error log table the error status information corresponding to the file extent information in the third command and transferring the error status information to said host processor, upon being initiated after termination of a control operation of said fourth means.

BRIEF DESCRIPTION OF THE DRAWINGS

FIGS. 3A to 3F are flow charts showing firmware processing in the disk cache processor; and FIG. 4 is a chart showing the mode of operation of the system shown in FIG. 1.

DESCRIPTION OF THE PREFERRED EMBODIMENTS

Figure 1:
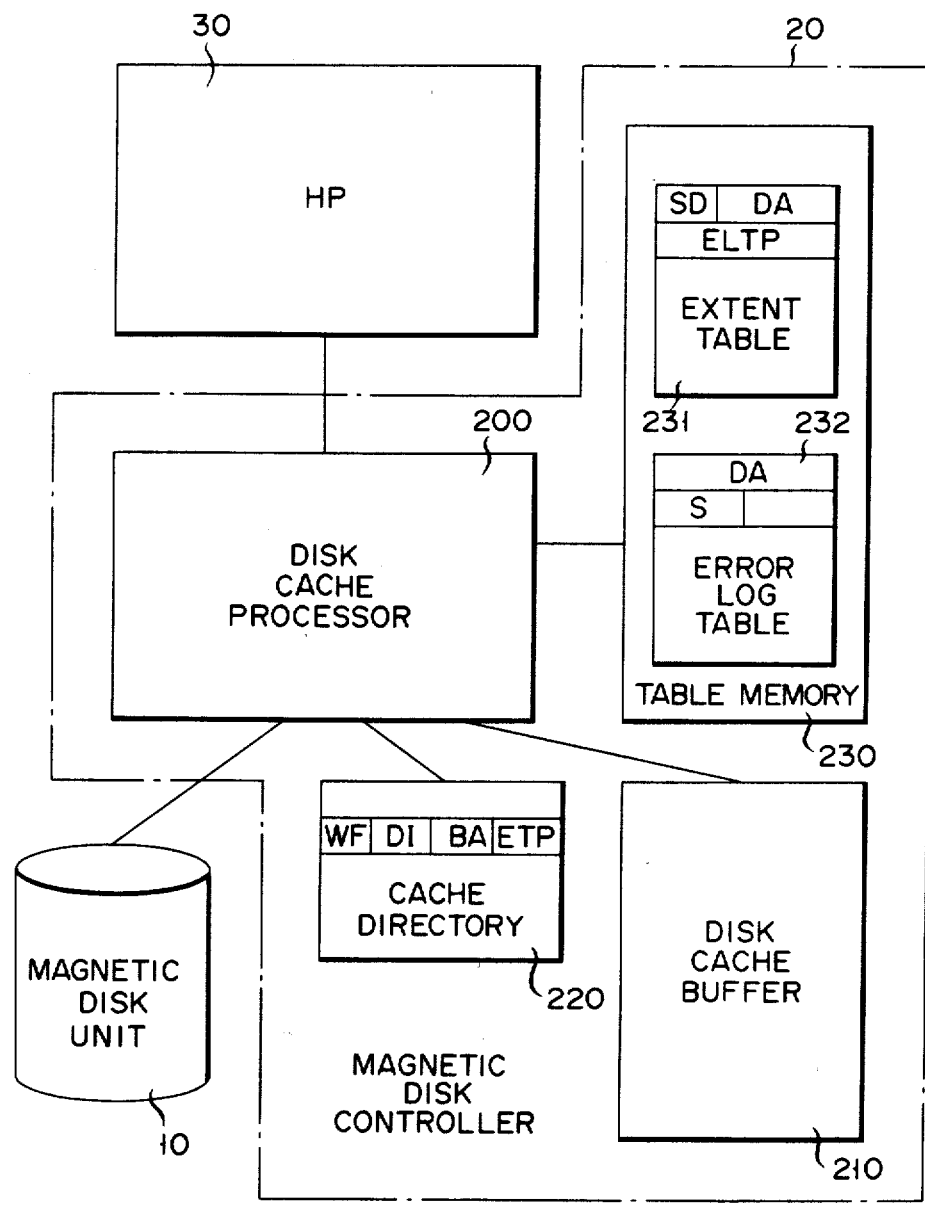
FIG. 1 is a block diagram showing the configuration of a disk cache system according to an embodiment of the present invention.

FIG. 1 is a block diagram of a disk cache system according to an embodiment of the present invention. A magnetic disk unit (to be referred to as a disk unit) 10 is connected to a magnetic disk controller (to be referred to as a disk controller hereinafter) 20 which is, in turn, connected to a host processor (HP) 30. The disk controller 20 has a disk cache processor 200, a disk cache buffer (to be referred to as a cache hereafter) 210, a cache directory (to be referred to as a directory hereafter) 220 and a table memory 230. The disk cache processor 200 mainly controls the cache 210 and the disk unit 10 by firmware control. Note that the firmware control used herein means a control wherein a set of commands stored in a memory are read out and executed by the disk cache processor 200. The cache 210 stores write data to be written in the disk unit 10 and data read out from the disk unit 10. The cache 210 is controlled in units of blocks of predetermined size (e.g., 1 track of the disk). The blocks are the mapping units from the disk unit 10 to the cache 210. The directory 220 has the same number of entries as that of the blocks of the cache 210. A buffer address BA, directory information DI, a write flag WF, and an extent table pointer ETP and so on are set in each entry of the directory 220. The buffer address BA indicates the start address of a block in the cache 210 assigned thereto. The directory information DI indicates an area in the disk unit 10 to which the block represented by the buffer address BA is assigned. The write flag WF indicates whether write of the data of a corresponding block into the disk unit 10 has been completed. The extent table pointer ETP is an entry pointer of an extent table 231. File extent information (to be referred to as extent information) and an error log table pointer ELTP are set in the extent table 231, and the table 231 is allocated in the table memory 230. The extent information indicates an area in the disk unit 10 which is defined for a file, and consists of size data SD representing the size of the area and disk address DA representing the start address of the area. The error log table pointer ELTP is a pointer of the error status information in an error log table 232 described below. The error status information is set in the error log table 232 and the table 232 is allocated in the table memory 230. The error status information indicates the contents of an error which is generated while the data of a block of the cache 210 is written in the disk unit 10, and consists of the disk address DA and status S. The cache 210, the directory 220, and the table memory 230 are connected to the disk cache processor 200.

Figure 2:
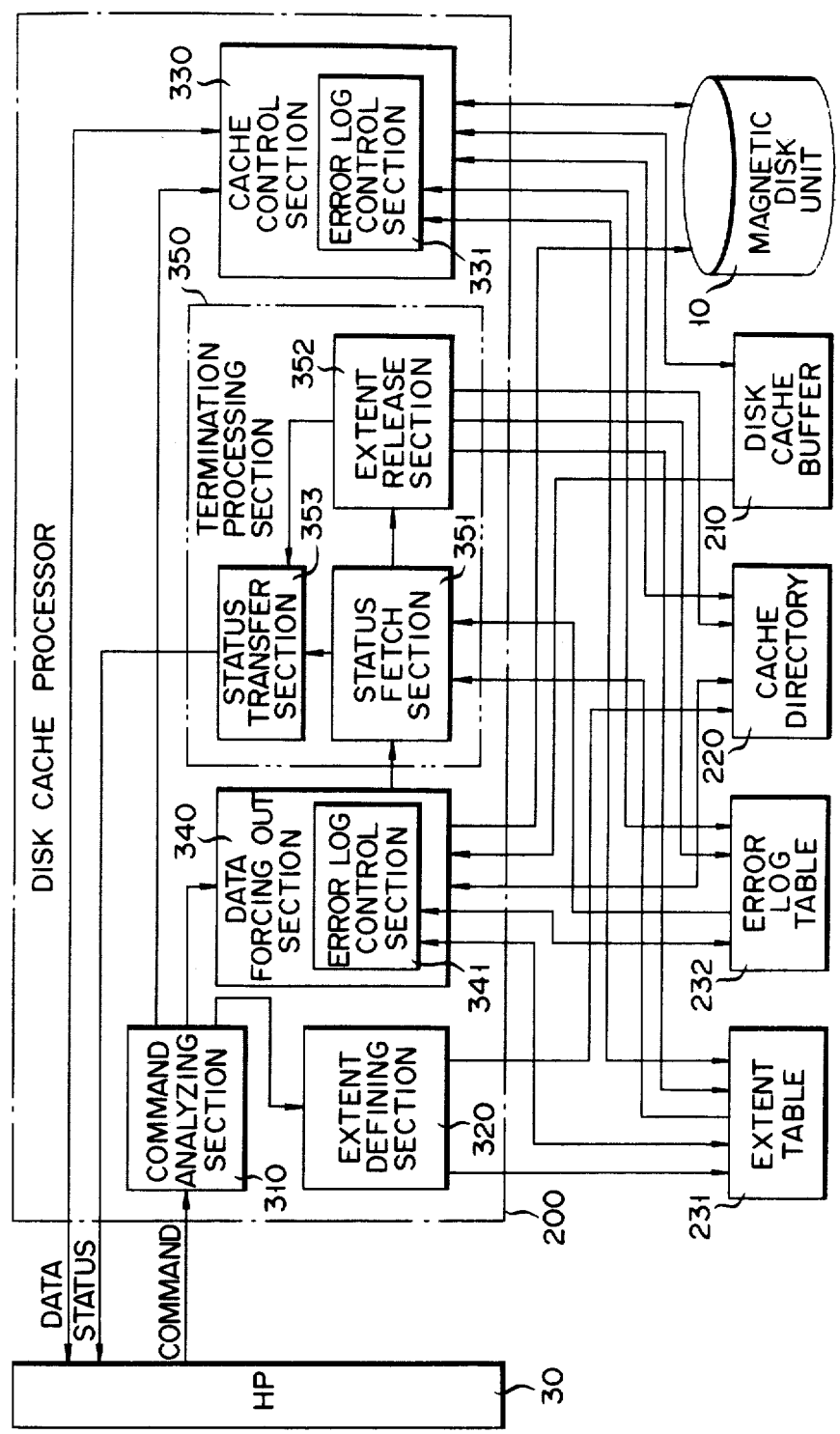
FIG. 2 is a block diagram showing the functions of the disk cache processor shown in FIG. 1.

The mode of operation of the disk cache system shown in FIG. 1 will now be described with reference to FIGS. 3 and 4. FIG. 2 is an imaginary block diagram of the disk cache processor 200. That is, in FIG. 2, the functions of the disk cache processor 200 are shown in blocks in order to allow easy understanding of the operation of the disk cache processor 200. Note that therefore FIG. 2 is not a physical block diagram of the disk cache processor 200. FIGS. 3A to 3F are flow charts of firmware processing in the disk cache processor 200, and FIG. 4 shows the operation of the disk cache system. As shown in FIG. 2, the disk cache processor 200 has a command analyzing section 310. A command transferred from the host processor 30 to the disk controller 20 is supplied to the command analyzing section 310 in the disk cache processor 200. The command analyzing section 310 analyzes the command received from the host processor 30 (step S1 in FIG. 3A).

In this embodiment, when a file is opened by the user's application program, an OS (operating system) of the host processor 30 generates a command (to be referred to as a DFAREA command) which defines a file area (in the disk unit 10) in accordance with an OPEN command. The DFAREA command has extent information as parameter information. When a DFAREA command is received from the host processor 30, the command analyzing section 310 causes an extent defining section 320 to continue the control operation. At this time, the extent information in the DFAREA command is supplied from the command analyzing section 310 to the extent defining section 320.

The extent defining section 320 defines a file area in accordance with steps S2 to S4 of FIG. 3A. More specifically, the extent information is set in the extent table 231 (step S2). Next, the extent defining section 320 sets a pointer to the extent information set in the extent table 231 this time (extent table pointer ETP) in entries of the directory 220 (step S3). In this case, entries are used which indicate that the areas in the disk unit 10 which are indicated by the extent information are allocated in the blocks in the cache 210. If entries of this type are unavailable, suitable entries are assured by the force-out algorithm in accordance with the LRU (Least Recently Used) rule. Next, the extent defining section 320 assures the blocks in the cache 210 to which the areas in the disk unit 10 represented by the extent information are assigned (step S4). This is performed by setting the directory information DI in an entry (entry of the directory 220) in which the extent table pointer ETP is set. The directory information D is created in accordance with the extent information (i.e., the size data SD and the disk address DA) and the block size. After performing steps S2 to S4, the extent defining section 320 stops its control operation and the command analyzing section 310 resumes its control operation.

Assume that a WRITE command in accordance with the user's application program is transferred from the host processor 30 to the disk controller 20. The command requests data write into the disk unit 10 and has as parameter information a transfer byte number and a disk address (start address of the transfer destination area). The WRITE command from the host processor 30 is supplied to the command analyzing section 310 in the disk cache processor 200. In response to the WRITE command, the command analyzing section 310 stops its control operation and a cache control section 330 starts controlling. At this time, the parameter information of the WRITE command is supplied from the command analyzing section 310 to the cache control section 330.

Upon starting the control operation after the command analyzing section 310 stops its control operation, the cache control section 330 performs cache control processing (step S5 in FIG. 3A). In this example wherein the command from the host processor is a WRITE command, the cache control section 330 performs the cache control processing in the following manner. First, the cache control section 330 creates directory information in accordance with the disk address in the parameter information of the WRITE command. Subsequently, the cache control section 330 searches the directory 220 in accordance with the directory information to find an entry in which the directory information DI corresponding to this directry information is set. The cache control section 330 then fetches the buffer address BA from this entry and creates an address of the cache 210 in accordance with the buffer address BA and the disk address in the parameter information of the WRITE command. The cache control section 330 stores the data from a main memory (not shown) into an area of the cache 210 which starts from this created address, and sets the write flag WF in the corresponding entry of the directory 220 to logic level "1". The number of bytes of the data stored in the cache 210 is indicated by the transfer byte number in the parameter information of the WRITE command. If the cache 210 is used in the store-in mode, when the cache control section 330 completes data storage in the cache 210, it supplies an interrupt signal to the host processor 30. Then, the cache control section 330 is set in the idle status. When the host processor 30 accepts an interrupt signal from the cache control section 330, that is, an interrupt signal from the disk controller 20, it supplies another WRITE command to the disk controller 20. Then, the disk controller 20 executes data writing into the cache 210.

While the section 330 is set in the idle status, the cache control section 330 searches for an entry for which the write flag WF in the directory 220 is set at logic level "1", and writes the data read out from the block corresponding to the searched entry into the disk unit 10, as indicated by arrow a in FIG. 4. At this time, the cache control section 330 sets the write flag WF to logic level "0". This write operation is performed in accordance with the FIFO/LRU (First In First Out/Least Recently Used) control. The cache control operation as described above is known.

The cache control section 330 has an error log control section 331. The error log control section 331 discriminates if an error (e.g., a CRC error, a seek error or the like) has been generated in the write processing into the disk unit 10 (step S6 in FIG. 3B). When the error log control section 331 detects generation of an error, it accesses the extent table 231 using the extent table pointer ETP in the corresponding entry of the directory 220 and discriminates if the error log table pointer ELTP is set at an entry of the table 231 which is designated by the pointer ETP (step S7). Note that extent information defining a file area including an area involving an error in the disk unit 10 is set in a predetermined field of the entry which is designated by the pointer ETP.

Figure 3B:
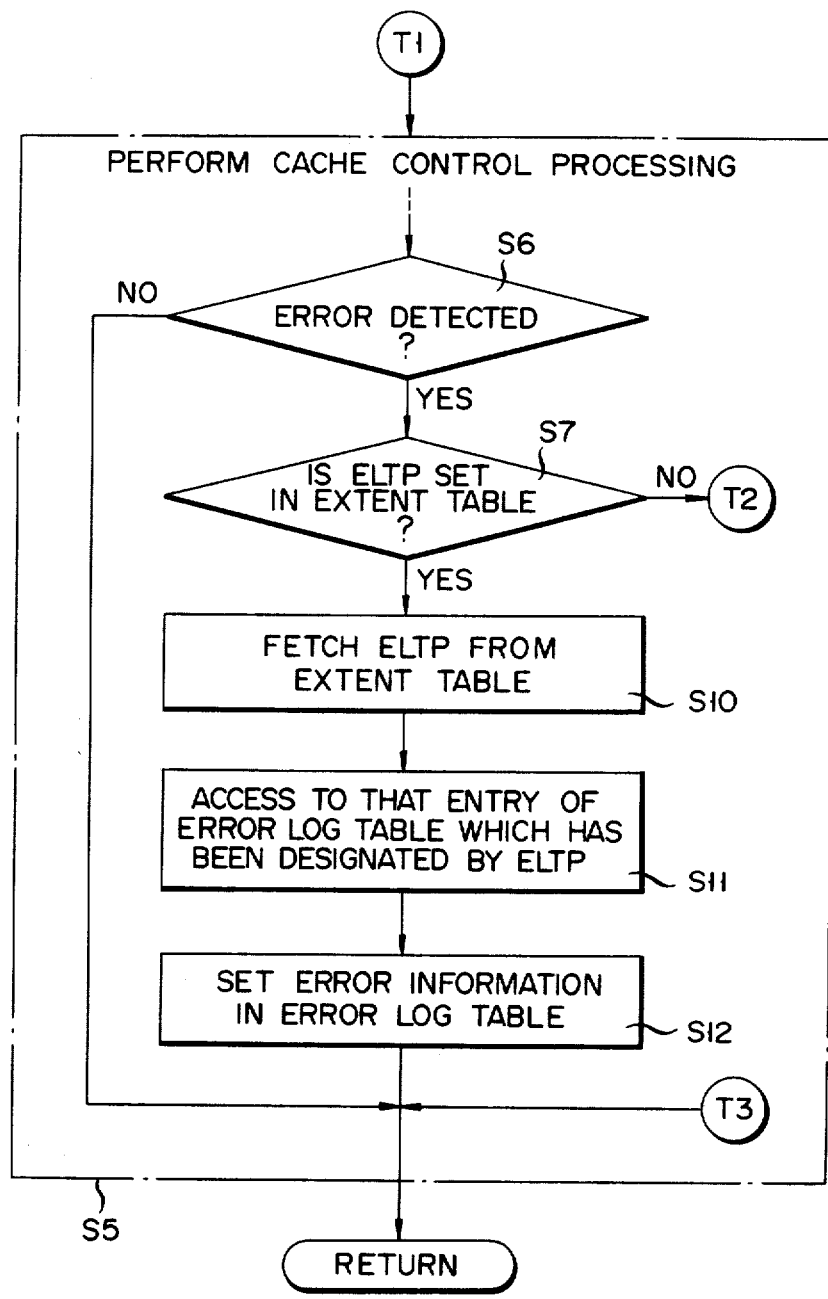
Figure 3C:
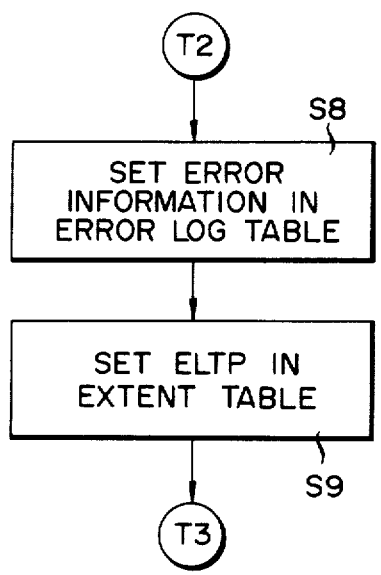

If the error log table pointer ELTP is not set in the specified entry of the extent table 231, the error log control section 331 sets the error status information in the error log table 232, as indicated by arrow b in FIG. 4 (step S8 in FIG. 3C). The error status information consists of the disk address DA and the status S. Then, the error log control section 331 sets the pointer (error log table pointer ELTP) to the error status information in a predetermined field of the entry of the extent table 231 which is designated by the pointer ETP (step S9).

In contrast to this, if the error log table pointer ELTP is set in the extent table 231, the error log control section 331 reads out the pointer ELTP from the table 231 (step S10 in FIG. 3B). The error log control section 331 then accesses an entry of the error log table 232 which is designated by the error log table pointer ELTP (step S11). Start information of the error status information which relates to the area indicated by the extent information and which is in the specified entry of the extent table 231 is set at this entry. A pointer to the next information is added to the start information. Accordingly, using the pointer as a guide, the error status information which is final at each moment can be obtained. Subsequently, the error log control section 331 sets updated error status information in the error log table 232 (step S12). At this time, the control section 331 adds the pointer to the updated error status information to the previous error status information. It is generally known in the field of data processing to link a plurality of data using pointers.

The important points in the operation of the error log control section 331 are as follows. First, if an error is caused when data is stored in the cache 210, the corresponding error status information is set in the error log table 232. Second, the error status information in the error log table 232 is designated by the error log table pointer ELTP. Third, the error log table pointer ELTP is set in an entry of the extent table 230 at which the extent information defining the file area including an area involved in an error is set. In this embodiment, if an error is caused when data is written in the disk unit 10, alternate processing is performed. In the alternate processing, alternate tracks are allocated, and retry is performed. If the error occurs again during this retry, the corresponding error status information is set in the error log table 232.

The user's application program is programmed to generate a command COMMIT at a logical termination unit (i.e., data update unit). In this embodiment, the OS of the host processor 30 generates an FOUT (FORCE OUT) command in response to the COMMIT command. The FOUT command has extent information as parameter information. The FOUT command instructs that the data (data which has not been written in the disk unit 10) in the blocks of the cache 210, to which the areas in the disk unit 10 represented by the extent information are assigned, be forced into the disk unit 10. A CLOSE option is added to this FOUT command as needed. The CLOSE option commands the release of the entry in the directory 220 and the extent table 231 which is indirectly indicated by the extent information.

The FOUT command from the host processor 30 is supplied to the command analyzing section 310 of the disk cache processor 200. When the command received from the host processor 30 is an FOUT command, the command analyzing section 310 stops its control operation and a data forcing out section 340 starts controlling. At this time, the extent information in the FOUT command is supplied from the command analyzing section 310 to the data forcing out section 340.

Figure 3D:
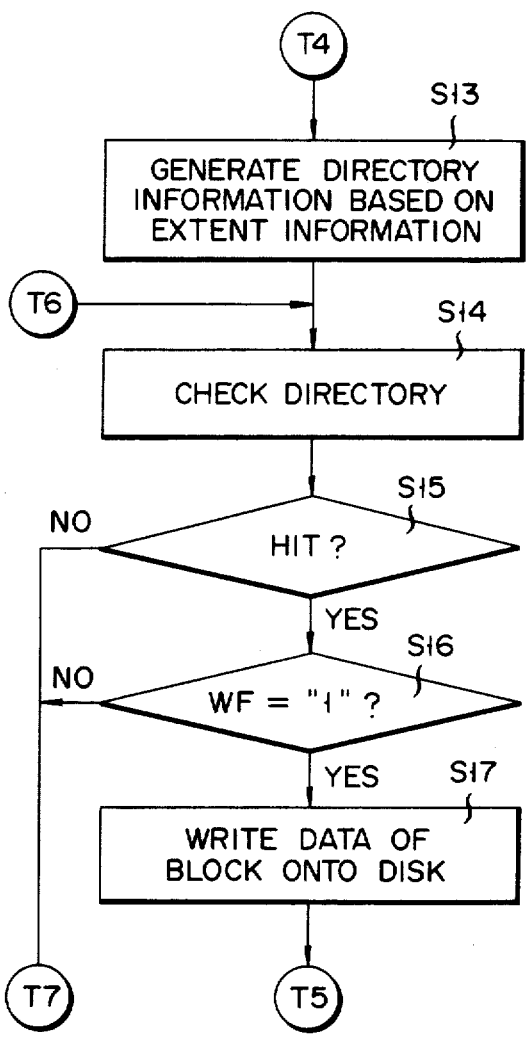
Figure 3F:
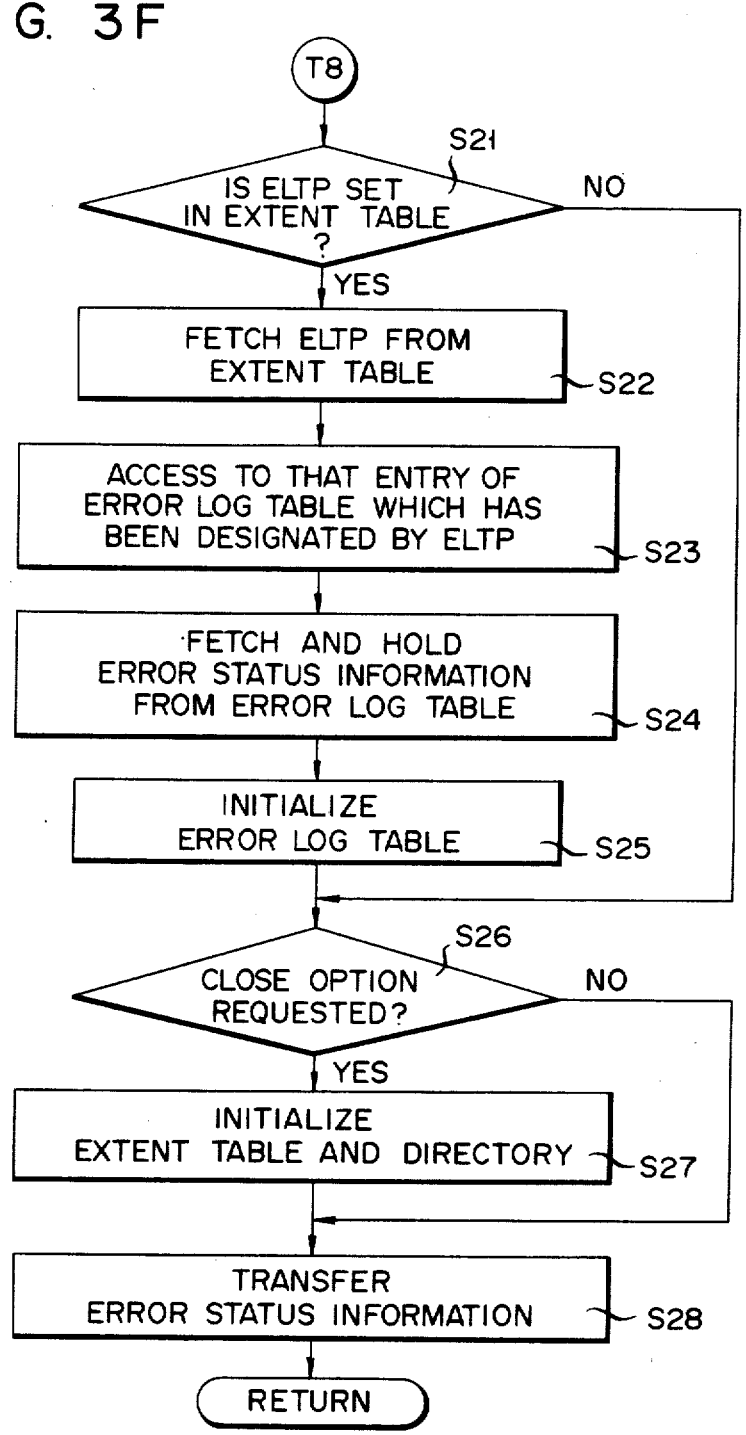

Upon termination of the control operation of the data command analyzing section 310, the data forcing out section 340 creates initial directory information in accordance with the extent information in the FOUT command for checking the directory 220 (step S13 in FIG. 3D). Next, the data forcing out section 340 checks the directory 220 using the directory information (step S14) and determines if the desired data is present in the cache 210 (i.e., if the cache 210 has been hit; step S15). When a "hit" is detected, the data forcing out section 340 determines if the write flag WF at the corresponding entry of the directory 220 is at logic level "1" (step S16). When the data forcing out section 340 determines that the write flag WF is at logic level "1", the data forcing out section 340 writes into the disk unit 10 the data of the block of the cache 210 which is designated by the buffer address BA of the same entry (step S17). At this time, the data forcing out section 340 sets the corresponding write flag WF at logic level "0".

The data forcing out section 340 has an error log control section 341. When the data of the block of the cache 210 is forced out into the disk unit 10, the error log control section 341 executes an error log control routine (step S18 of FIG. 3E). The contents of this routine are the same as the processing contents of the error log control section 331 in the cache control section 330. Accordingly, the detailed processing operation of the error log control section 341 will not be described.

When the processing by the error log control section 341 is completed, the data forcing out section 340 discriminates if the directory information used for checking in step S14 of FIG. 3D is the last directory information (step S19 in FIG. 3E). If NO in step S19, the data forcing out section 340 creates the next directory information in accordance with the extent information in the FOUT command (step S20 in FIG. 3E), and checks the directory 220 using the updated information (step S14 in FIG. 3D).

If NO in step S15, the data forcing out section 340 skips steps S16 to S18 and executes step S19. If NO in step S16, the data forcing out section 340 skips steps S17 and S18 and executes step S19.

If YES in step S19, the data forcing out section 340 determines that the data of the blocks secured in the cache 210 in correspondence with the extent information has been completely written in the disk unit 10 and causes a status fetch section 351 in a termination processing section 350 to start controlling. At this time, the extent information in the FOUT command is supplied from the data forcing out section 340 to the status fetch section 351.

The status fetch section 351 searches the extent table 231 to find an entry of the extent table 231 in which the extent information coinciding with index data is set, using the extent information in the FOUT command as the index data. The status fetch section 351 then discriminates if an error log table pointer ELTP is set at the corresponding entry. The above is the processing content of step S21 of FIG. 3F. When the status fetch section 351 determines that the desired error log table pointer ELTP is set in the extent table 231, it fetches the pointer ELTP from the table 231 (step S22). The status fetch section 351 then accesses an entry of the error log table 232 which is designated by the error log table pointer ELTP (step S23). Subsequently, the status fetch section 351 fetches and holds the error status information from this entry (step S24). If a pointer to the next error status information is added to the fetched information, the information designated by this pointer is fetched and held. This also applies to the case wherein there is subsequent error status information. When the status fetch section 351 fetches and holds from the error log table 351 all the error status information for the area of the disk unit 10 which is indicated by the extent information, it causes an extent release section 352 to start controlling. If NO in step S21, the status fetch section 351 does not perform steps S22 to S24 but immediately causes the extent release section 352 in the termination processing section 350 to start controlling.

The extent release section 352 initializes (releases) the error log table 232 (step S25). Note that the area of the error log table 232 which is to be initialized is an area which stores the error status information which is fetched by the status fetch section 351. Then, the extent release section 352 discriminates if a CLOSE option is added to the FOUT command (step S26). If YES in step S26, the extent release section 352 initializes (releases) the extent table 231 and the directory 220 (step S27) and thereafter causes a status transfer section 353 of the termination processing section 350 to start controlling. Note that an area of the extent table 231 which is to be initialized is an entry in which information identical with the extent information in the FOUT command is set. Similarly, an area of the directory 220 which is to be initialized is entries which indicate that the area of the disk unit 10 which is represented by the extent information in the FOUT command is assigned to the blocks in the cache 210. If NO in step S26, the extent release section 352 does not perform step S27 and immediately causes the status transfer section 353 to start controlling.

Upon starting the control operation, the status transfer section 353 transfers to the host processor 30 the error status information which has been held by the status fetch section 351 (step S28). When the host processor 30 receives this error status information, the program logically ends. When a COMMIT command is generated, the user's application program is set in the wait state until error status information is received from the disk conroller 20.

As is apparent from the above description, according to the embodiment of the present invention, even if data is written into a disk in the store-in mode, data on a disk cache and data of a corresponding area of the disk can be rendered to coincide with each other when the program ends. Furthermore, according to the embodiment of the present invention, even if the write operation of data in the disk buffer is performed non-synchronously with the program operation in the store-in mode, error status information for all the errors generated during the data write operation can be signalled to the program when the program logically ends. Accordingly, error recovery can be performed by means of the program.

Although the present invention has been described with reference to the particular embodiment, the present invention is not limited to this. Various other changes and modifications may be made within the spirit and scope of the present invention.

What is claimed is:

1. A disk cache system comprising;
   a host processor;
   a disk unit; and
   a disk controller interposed therebetween and incorporating therein a disk cache buffer,
   said disk controller having
   a cache directory for controlling said disk cache buffer in units of blocks of a predetermined size and having write flags in respective entries,
   an error log table in which error status information is set,
   an extent table having entries in which file extent information is set,
   first means, responsive to a first command generated from the host processor and having file extent information defining a file area, for setting the file extent information in the extent table and for securing a corresponding area in said disk cache buffer,
   second means, responsive to a second command generated from said host processor and requesting write into said disk unit, for storing data into the corresponding area of said disk cache buffer and for setting the write flag of a corresponding entry of said cache directory,
   third means for writing into said disk unit data in said disk cache buffer which has not been written in said disk unit utilizing an idle time of input/output processing using said disk cache buffer and for resetting the write flag of the corresponding entry of said cache directory,
   fourth means, responsive to a third command generated from said host processor, having the file extent information, and designating a logical termination unit of a program, for writing into said disk unit data corresponding to a file area represented by the file extent information in said third command and for resetting the write flag of the entry of said cache directory, said data being selected from the data in said disk cache buffer which has not been written in said disk unit,
   fifth means, when an error is generated during data write into said disk unit, for setting the error status information into said error log table such that said error status information corresponds to the file extent information stored in said extent table and defining file areas including an area in which the data is to be written, and
   sixth means, upon being initiated after termination of a control operation of said fourth means, for selectively fetching from the error log table the error status information corresponding to the file extent information in the third command and transferring the error status information to said host processor.

2. A system according to claim 1, wherein the entries of said cache directory have first fields in which extent table pointers representing locations of the entries of said extent table are set.

3. A system according to claim 2, wherein said first means sets, the extent table pointers of the entries of said extent table in which the file extent information of the first command is set, in the first fields of the entries of said cache directory which correspond to the area secured in said disk cache buffer.

4. A system according to claim 3, wherein the entries of said extent table have second fields in which error log table pointers for the error status information in said error log table are set.

5. A system according to claim 4, wherein said fifth means refers to said extent table using the extent table pointer in the corresponding entry of said cache directory when an error is caused during a write of data into said disk unit.

6. A system according to claim 5, wherein said fifth means sets the error log table pointer in the second field of said extent table which is indicated by the extent table pointer.

7. A system according to claim 6, wherein said sixth means searches said extent table using the file extent information of the third command and fetches the error log table pointer from the searched entry.

8. A system according to claim 7, wherein said sixth means is accessed to said error log table, in accordance with the error log table pointer fetched from said extent table.

* * * * *